(12) United States Patent
Levola (10) Patent No.: US 8,254,031 B2
(45) Date of Patent: Aug. 28, 2012

(54) COLOR DISTRIBUTION IN EXIT PUPIL EXPANDERS

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 596 days.

(21) Appl. No.: 12/227,738

(22) PCT Filed: Jun. 2, 2006

(86) PCT No.: PCT/IB2006/001450
§ 371 (c)(1),
(2), (4) Date: Oct. 19, 2009

(87) PCT Pub. No.: WO2007/141587
PCT Pub. Date: Dec. 13, 2007

(65) Prior Publication Data
US 2010/0165465 A1 Jul. 1, 2010

(51) Int. Cl.
*G03H 1/00* (2006.01)
*G02B 27/14* (2006.01)

(52) U.S. Cl. .................. 359/634; 359/13; 359/633

(58) Field of Classification Search .............. 359/13, 359/630, 633–634, 885; 345/7–9
See application file for complete search history.

(56) References Cited

U.S. PATENT DOCUMENTS

| | | | | |
|---|---|---|---|---|
| 6,117,923 | A | 9/2000 | Amatai et al. | 523/440 |
| 6,464,733 | B2 | 10/2002 | Ryser | 8/444 |
| 6,805,490 | B2 | 10/2004 | Levola | 358/67 |
| 7,206,107 | B2 | 4/2007 | Levola | 359/34 |
| 2004/0233534 | A1 | 11/2004 | Nakanishi et al. | 359/572 |

FOREIGN PATENT DOCUMENTS

| | | |
|---|---|---|
| JP | 57014806 A | 1/1982 |
| JP | 2006-502436 A | 1/2006 |
| WO | 99/52002 | 10/1999 |
| WO | 03/032017 A2 | 4/2003 |
| WO | WO 2004/034106 A1 | 4/2004 |
| WO | 2004/055556 A1 | 7/2004 |
| WO | 2004/109349 A2 | 10/2004 |

OTHER PUBLICATIONS

Tapani Levola, 7.1: Invited Paper: Novel Diffractive Optical Components for Near to Eye Displays, J. of SID, 2006, ISSN0006-0966X/06/3701-0000 (4 pages).
International Search Report dated Jan. 9, 2007 in corresponding International Application No. PCT/IB2006/001450 (3 pages).
Extended European Search Report dated Apr. 28, 2011 in corresponding European Application No. 06755936.9 (6 pages).
Levola, Tapani, "Diffractive optics for virtual reality displays," Journal of the SID 14/5, (2006), pp. 467-475.
Levola, Tapani, "7.1: Invited Paper: Novel Diffractive Optical Components for Near to Eye Displays," SID Symposium Digest of Technical Papers—Jun. 2006—vol. 37, Issue 1, pp. 64-67.
Tapani Levola, Diffractive Optics for Virtual Reality Displays, J. of SID, 14/5, 2006 p. 467-475. Tapani Levola, 7.1: Invited Paper: Novel Diffractive Optical Components for Near to Eye Displays, J. of SID, 2006, ISSN0006-0966X/06/3701-0000.
Tapani Levola, 22.1: Invited Paper: Diffractive Optics for Virtual Reality Displays, EuroDisplay 2005, p. 538-541.
M. Breidne, et. al., Blazed holographic gratings, Optica Acta, 26/11, 1979, p. 1427-1441.
J. Michael Miller, et. al., Design and fabrication of binary slanted surface-relief gratings for a planar optical interconnection, Applied Optics, 36/23, Aug. 10, 1997, p. 5717-5727.
Y. Amitai, et. al., Visor-display design based on planar holographic optics, Applied Optics, 34/8, Mar. 10, 1995, p. 1352-1356.
Japanese Office Action from Japanese Patent Application No. 2009-512688, mailed Feb. 7, 2012.

*Primary Examiner* — Stephone Allen
*Assistant Examiner* — Kimberly N Kakalec
(74) *Attorney, Agent, or Firm* — Alston & Bird LLP (57) ABSTRACT

The specification and drawings present a new apparatus and method for providing color separation in an exit pupil expander system that uses a plurality of diffractive elements for expanding the exit pupil of a display in an electronic device for viewing by introducing a selectively absorbing area or areas in the exit pupil expanders.

22 Claims, 6 Drawing Sheets

COLOR DISTRIBUTION IN EXIT PUPIL EXPANDERS

TECHNICAL FIELD

PRIORITY AND CROSS-REFERENCE TO RELATED APPLICATION

This application is a US National Stage Application from PCT International Application No. PCT/IB2006/001450 filed on Jun. 2, 2006 (International Publication No. W02007141587).

The present invention relates generally to a display device and, more specifically, to providing color separation in exit pupil expanders that use a plurality of diffractive elements for expanding the exit pupil of a display for viewing.

BACKGROUND ART

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50-100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-Eye Display (NED), the exit pupil is typically of the order of 10 mm in diameter. Further enlarging the exit pupil makes using the virtual display significantly easier, because the device can be put at a distance from the eye. Thus, such a display no longer qualifies as a NED, for obvious reasons. Head-Up Displays are examples of the virtual display with a sufficiently large exit pupil.

DISCLOSURE OF THE INVENTION

According to a first aspect of the invention, an apparatus, comprises: at least one substrate of optical material having a first surface and a second surface; at least one diffractive element disposed on the first or the second surface of the at least one substrate and configured to receive an input optical beam; at least one further diffractive element disposed on the first or the second surface; and at least one optically absorbing area within or disposed on the at least one substrate, wherein at least part of the input optical beam is diffracted in the diffractive element to provide at least one diffracted optical beam substantially within the first and the second surfaces, and at least part of the at least one diffracted optical beam is coupled out of the at least one substrate by diffraction in the at least one further diffractive element, thus providing an output optical beam out of the at least one substrate with an expanded exit pupil in one or two dimensions, wherein the input optical beam comprises K wavelength components and the at least one optically absorbing area is configured to absorb M pre-selected components out of the K wavelength components of the at least one diffracted optical beam and to propagate a selected component out of the K wavelength components of the at least one diffracted optical beam, such that the output optical beam comprises the selected component out of the K wavelength components, wherein K is an integer of at least a value of two and M is an integer between 1 and K-1.

According further to the first aspect of the invention, the optical device may comprise N stacked substrates of optical material separated by a gap, N being an integer of at least a value of one, and the at least one substrate being one of the N substrates, wherein each of the N stacked substrates is configured to expand an exit pupil substantially of only one component out of the K wavelength components of the input optical beam such that all the K wavelength components merge together having substantially the same direction and location in an output of the optical device. Further wherein N=K.

According further to the first aspect of the invention, wherein M may be equal to K-1.

Still further according to the first aspect of the invention, the output optical beam provided by the at least one substrate substantially may comprise only the selected component out of the K wavelength components.

According further to the first aspect of the invention, the at least one optically absorbing area may be configured using at least one of: a) an absorbing tint spread throughout a volume of the at least one substrate, b) an absorbing tint spread throughout a thickness of the at least one substrate only in areas of the at least one substrate between the at least one diffractive element and at least one further diffractive element, c) an absorbing tint spread throughout a resin used to make the at least one diffractive element, d) an absorbing tint spread throughout the resin used to make the at least one further diffractive element, and e) an absorbing coating, having substantially the same index of refraction as the at least one substrate, disposed on the at least one substrate in an area substantially between the at least one diffractive element and the at least one further diffractive element.

According still further to the first aspect of the invention, the apparatus may further comprise: a further substrate of optical material having a further first surface and a further second surface, the further substrate being stacked substantially in parallel with the at least one substrate but maintaining a gap with the at least one substrate; at least one additional diffractive element disposed on the further first or the further second surface of the further substrate and configured to receive a portion of the input optical beam which propagates through the at least one substrate into the further substrate; at least one still further diffractive element disposed on the further first or the further second surface; and at least one further optically absorbing area within or disposed on the further substrate, wherein at least further part of the portion of the input optical beam is diffracted in the additional diffractive element to provide at least one further diffracted optical beam substantially within the further first and the further second surfaces, and at least further part of the at least one further diffracted optical beam is further coupled out of the further substrate by diffraction in the at least one still further diffractive element, thus providing a further output optical beam out of the further substrate with an expanded exit pupil in one or two dimensions, the further output optical beam having substantially the same direction and location as the output optical beam, wherein the at least one further optically absorbing area is configured to absorb P pre-selected components of the K wavelength components and to propagate a further selected component out of the K wavelength components, such that the further output optical beam comprises the further selected component out of the K wavelength components, wherein P is an integer between 1 and K-1. Further, wherein P is equal to K-1. Still further, the at least one further optically absorbing area may be configured using at least one of: a) an absorbing tint spread throughout a volume of the further substrate, b) an absorbing tint spread throughout a thickness of the further substrate only in areas of the further substrate between the at least one additional diffractive element and at least one still further diffractive element, c) an absorbing tint spread throughout a resin used to make the at least one additional diffractive element, d) an absorbing tint spread throughout the resin used to make the at least one still further diffractive element, and e) an absorbing coating, having substantially the same index of refraction as the further substrate, disposed on the further substrate between the at least one additional diffractive element and the at least one still further diffractive element. Yet still further, the gap may be an air gap. Still yet further, the output optical beam provided by the at least one substrate substantially may comprise only the selected component out of the K wavelength components and the further output optical beam provided by the further substrate substantially may comprise only the selected further component out of the K wavelength components and the output optical beam and the further output optical beam merge together having substantially the same direction and location.

Further still, the at least one substrate may be configured to have an additional optically absorbing layer disposed on or adjacent to a surface of the at least one substrate, the surface being a second surface through which the input optical beam propagates, such that the selected component out of the K wavelength components is substantially absorbed in the additional optically absorbing layer.

According further still to the first aspect of the invention, the apparatus may further comprise at least one intermediate diffractive element such that the at least part of the input optical beam diffracted in the at least one diffractive element is first coupled to the at least one intermediate diffractive element, which then couples, using a further diffraction in the at least one intermediate diffractive element, the at least part of the diffracted optical beam to the at least one further diffractive element, which then provides a two-dimensional exit pupil expansion of the input optical beam.

According to a second aspect of the invention, a method, comprises: receiving an input optical beam by at least one diffractive element disposed on a first or a second surface of at least one substrate, the input optical beam comprises K wavelength components, wherein K is an integer of at least a value of two; diffracting at least part of the input optical beam in the at least one diffractive element to provide at least one diffracted optical beam substantially within the first and second surfaces; absorbing M pre-selected components out of the K wavelength components of the at least one diffracted optical beam in at least one optically absorbing area within or disposed on the at least one substrate and propagating a selected component out of the K wavelength components of the at least one diffracted optical beam substantially without an optical intensity attenuation in the at least one optically absorbing area, wherein M is an integer between 1 and K-1; and coupling at least part of the at least one diffracted optical beam out of the at least one substrate by diffraction in the at least one further diffractive element, thus providing an output optical beam out of the at least one substrate with an expanded exit pupil in one or two dimensions, wherein the output optical beam comprises the selected component out of the K wavelength components.

According further to the second aspect of the invention, the output optical beam provided by the at least one substrate substantially may comprise only the selected component out of the K wavelength components.

Further according to the second aspect of the invention, the at least one optically absorbing area may be configured using at least one of: a) an absorbing tint spread throughout a volume of the at least one substrate, b) an absorbing tint spread throughout a thickness of the at least one substrate only in areas of the at least one substrate between the at least one diffractive element and at least one further diffractive element, c) an absorbing tint spread throughout a resin used to make the at least one diffractive element, d) an absorbing tint spread throughout the resin used to make the at least one further diffractive element, and e) an absorbing coating, having substantially the same index of refraction as the at least one substrate, disposed on the at least one substrate in an area substantially between the at least one diffractive element and the at least one further diffractive element.

According to a third aspect of the invention, an electronic device, comprises:
 a data processing unit;
 an optical engine operatively connected to the data processing unit for receiving image data from the data processing unit;
 a display device operatively connected to the optical engine for forming an image based on the image data; and
 an exit pupil expander comprising:
  at least one substrate of optical material having a first surface and a second surface;
  at least one diffractive element disposed on the first or the second surface of the at least one substrate and configured to receive an input optical beam;
  at least one further diffractive element disposed on the first or the second surface; and
  at least one optically absorbing area within or disposed on the at least one substrate, wherein
  at least part of the input optical beam is diffracted in the diffractive element to provide at least one diffracted optical beam substantially within the first and the second surfaces, and
  at least part of the at least one diffracted optical beam is coupled out of the at least one substrate by diffraction in the at least one further diffractive element, thus providing an output optical beam out of the at least one substrate with an expanded exit pupil in one or two dimensions, wherein
  the input optical beam comprises K wavelength components and the at least one optically absorbing area is configured to absorb M pre-selected components out of the K wavelength components and to propagate a selected component out of the K wavelength components substantially without an optical intensity attenuation, such that the output optical beam comprises the selected component out of the K wavelength components, wherein K is an integer of at least a value of two and M is an integer between 1 and K-1.

Further according to the third aspect of the invention, the exit pupil expander may comprise N stacked substrates of optical material separated by a gap, N being an integer of at least a value of one, and the at least one substrate being one of the N substrates, wherein each of the N stacked substrates is configured to expand an exit pupil substantially of only one component out of the K wavelength components of the input optical beam such that all the K wavelength components merge together having substantially the same direction and location in an output of the optical device. Further, wherein N=K.

Still further according to the third aspect of the invention, M may be equal to K-1.

According further to the third aspect of the invention, the output optical beam provided by the at least one substrate substantially may comprise only the selected component out of the K wavelength components.

According still further to the third aspect of the invention, the at least one optically absorbing area may be configured using at least one of: a) an absorbing tint spread throughout a volume of the at least one substrate, b) an absorbing tint spread throughout a thickness of the at least one substrate only in areas of the at least one substrate between the at least one diffractive element and at least one further diffractive element, c) an absorbing tint spread throughout a resin used to make the at least one diffractive element, d) an absorbing tint spread throughout the resin used to make the at least one further diffractive element, and e) an absorbing coating, having substantially the same index of refraction as the at least one substrate, disposed on the at least one substrate in an area substantially between the at least one diffractive element and the at least one further diffractive element.

According to a fourth aspect of the invention, an apparatus, comprises: at least one means for diffraction,
  for receiving an input optical beam by at least one means for diffraction disposed on a first or a second surface of at least one substrate, the input optical beam comprises K wavelength components, wherein K is an integer of at least a value of two, and
  for diffracting at least part of the input optical beam in the at least one means for diffraction to provide at least one diffracted optical beam substantially within the first and second surfaces;
  at least one absorbing means within or disposed on the at least one substrate, for absorbing M pre-selected components out of the K wavelength components of the at least one diffracted optical beam by the at least one absorbing means and propagating a selected component out of the K wavelength components of the at least one diffracted optical beam substantially without an optical intensity attenuation in the at least one optically absorbing area, wherein M is an integer between 1 and K-1; and
  at least one further means for diffraction, for coupling at least part of the at least one diffracted optical beam out of the at least one substrate by diffraction in the at least one further means for diffraction, thus providing an output optical beam out of the at least one substrate with an expanded exit pupil in one or two dimensions, wherein the output optical beam comprises the selected component out of the K wavelength components.

According further to the fourth aspect of the invention, the apparatus may be an exit pupil expander.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new method and apparatus are presented for providing color separation in an exit pupil expander system that uses a plurality of diffractive elements for expanding the exit pupil of a display in an electronic device for viewing by introducing a selectively absorbing area or areas in the exit pupil expanders. The embodiments of the present invention can be applied to a broad optical spectral range of optical beams but most importantly to a visible part of the optical spectrum where the optical beams are called light beams.

According to an embodiment of the present invention, an optical device (e.g., the optical device can be a part of a virtual reality display) can comprise N (N being an integer of at least a value of one) stacked substantially parallel substrates of optical material separated by a gap (the gap can be a material with a substantially smaller index of refraction than in the substrates, e.g., an air gap), each such substrate having a first surface and a second surface and acting as an exit pupil expander. Each substrate can comprise at least one diffractive element (e.g., a diffractive grating) disposed on the first or the second surface of said at least one substrate and which is configured to receive an input optical beam (i.e., at least one diffractive element acts as an in-coupling grating). It is noted that after propagating through the in-coupling grating of the first substrate, some "unselected" wavelength components of the input optical beam (i.e., a portion of the input optical beam) are received by the in-coupling grating of a second substrate in a stack of the N substrates and so on. It is also noted that in a biocular system it can be one or two in-coupling gratings adjacent to each other for the left and for the right eye, which are configured to split the input optical beam into two substantially equal components in two substantially opposite directions. Each substrate can further comprise at least one further diffractive element (e.g., a diffractive grating) disposed on the first or the second surface and acting as an out-coupling grating. Again, in a biocular system it can be two out-coupling gratings symmetrically located in the substrate to provide out-coupling for the left and for the right eye.

Moreover, according to an embodiment of the present invention, each substrate may comprise at least one optically absorbing area or areas within or disposed on the substrate.

Thus, at least part of the input optical beam can be diffracted in the diffractive element (the in-coupling grating) to provide at least one (two in the biocular systems) diffracted optical beam substantially within the first and the second surfaces due to a total internal reflection, and then at least part of the at least one diffracted optical beam is further coupled out of each substrate by diffraction in the at least one further diffractive element (the out-coupling grating), thus providing an output optical beam (or two beams for the biocular systems) out of each substrate with an expanded exit pupil in one or two dimensions using wavelength selectivity as explained below.

According to an embodiment of the present invention, the input optical beam can comprise K wavelength components (K being an integer of at least a value of two), such that the at least one optically absorbing area within or disposed on each of the substrates is configured to absorb M (M being an integer between 1 and K-1) pre-selected components of the K wavelength components and to propagate a selected component out of the K wavelength components, e.g., substantially without an optical intensity attenuation due to absorption. Then the output optical beam from each substrate substantially comprises the selected component out of the K wavelength components. It is noted that the diffraction gratings in each substrate are optimized (e.g., by choosing the appropriate period of the periodic lines) for the wavelength component to be selected by that grating.

Thus, each of the N stacked substrates is configured to expand an exit pupil of substantially only one component out of said K wavelength components of the input optical beam such that all said K wavelength components merge together having substantially the same direction and location in an output of said optical device, therefore providing a color separation using the N exit pupil expanders that use a plurality of diffractive elements for expanding the exit pupil, e.g., of a display in the electronic device for viewing.

In one possible embodiment, N can be equal to K, i.e., each substrate only can output one wavelength (color) component. In another embodiment, the optically absorbing area for any substrate out of the N substrates can be configured to absorb all K-1 wavelength components except only one selected wavelength components band to be provided in the output optical beam from that substrate. Also different substrates can be configured to absorb a different number of wavelength components depending on a specific system design.

According to a further embodiment of the present invention, in case of a two-dimensional exit pupil expansion, each substrate can comprise at least one intermediate diffractive element (two intermediate diffractive elements for the biocular case) such that the at least part of the input optical beam diffracted in the at least one diffractive element is first coupled to the at least one intermediate diffractive element, which then couples, using a further diffraction in the at least one intermediate diffractive element, the at least part of said diffracted optical beam to the at least one further diffractive element, which then provides a two-dimensional exit pupil expansion of said input optical beam. The intermediate diffractive element can have an odd number of first order diffractions or an even number of further first order reflections as known in the art and, e.g., described by T. Levola in "Diffractive Optics for Virtual Reality Displays", SID Eurodisplay 05, Edinburg (2005), SID 02 Digest, Paper 22.1.

Furthermore, according to an embodiment of the present invention, the at least one optically absorbing area within or disposed on each substrate can be configured using at least one approach or a combination thereof out of:

a) an absorbing tint spread throughout a volume of each substrate,
b) an absorbing tint spread throughout a thickness of each substrate only in areas of each substrate between the at least one diffractive element and at least one further diffractive element (i.e., between the in-coupling and the out-coupling diffraction gratings),
c) an absorbing tint spread throughout a resin used to make the at least one diffractive element, the at least one further diffractive element, and/or the intermediate grating,
d) an absorbing coating, having substantially the same index of refraction as each substrate, disposed on each substrate in an area substantially between the at least one diffractive element and at least one further diffractive element (i.e., between the in-coupling and the out-coupling diffraction gratings), etc.

In a further embodiment of the present invention, each substrate can be configured to have an additional optically absorbing layer disposed on or adjacent to a surface of that substrate, wherein the surface being a second surface of that substrate through which the input optical beam propagates after being received by the substrate, such that the selected component out of the K wavelength components selected by that substrate is substantially absorbed in the additional optically absorbing layer, thus preventing said selected wavelength component from entering the next substrate.

One practical example for implementing embodiments of the present invention can be a color separation for an RGB (red, green, blue) gamut. In this case, the first substrate in the stack can "select" a short blue wavelength component and "absorb" the green and red, the second substrate can "select" a green component, and "absorb" the blue and red, and finally the third substrate in the stack can "select" a long red wavelength component and "absorb" the green and blue. More implementation examples are provided in FIGS. 2 through 6, according to various embodiments of the present invention.

Figure 1A:
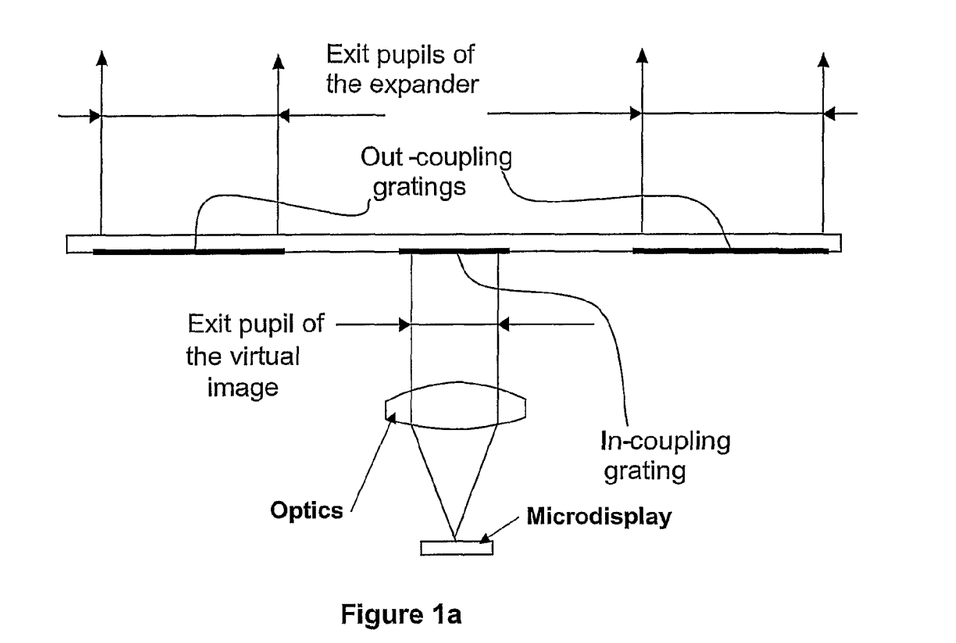
FIGS. 1a and 1b are schematic representations of a virtual reality display (a cross sectional view shown in FIGS. 1a) having an exit pupil expander system with stacked diffractive exit pupil expanders (a cross sectional view is shown in FIG. 1b)
Figure 1B:
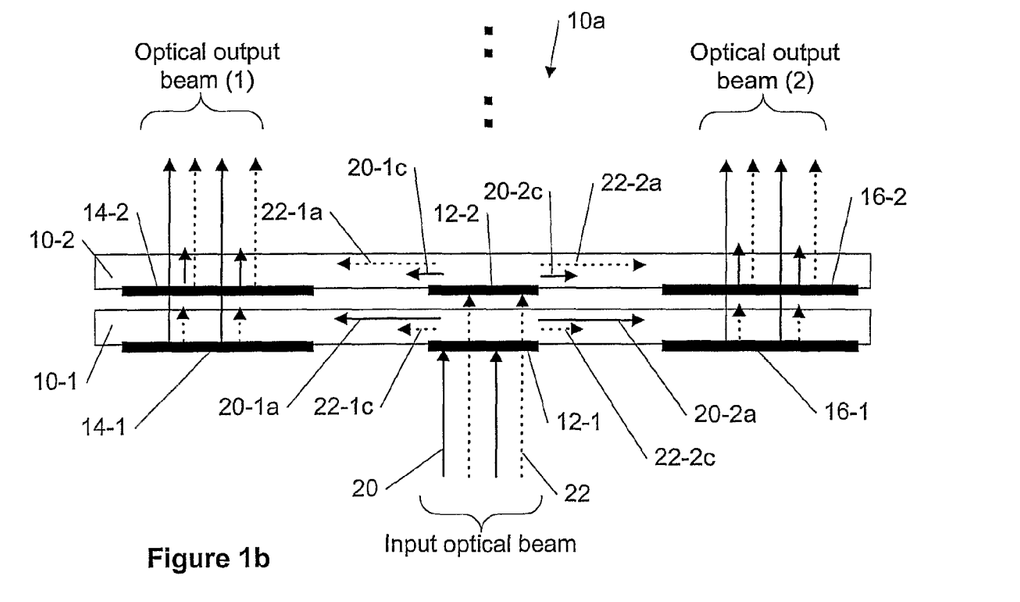

FIGS. 1a and 1b show schematic representations of a virtual reality display (a cross sectional view shown in FIGS. 1a) having an exit pupil expander system 10a with stacked diffractive exit pupil expanders 10-1, 10-2, etc. as shown in a cross sectional view in Figure 1b with in-coupling gratings 12-1 and 12-2, etc. and out-coupling gratings 14-1, 14-2, 16-1 and 16-2 for the biocular case. For simplicity, the input optical beam has two wavelength components 20 ($\lambda_1$) and 22 ($\lambda_2$). In an approach shown in FIG. 1b, both components 20 and 22 are coupled (see corresponding optical beams 20-1a, 22-1a, 20-2a, 22-2a, and unwanted optical beams 20-1c, 22-1c, 20-2c, 22-2c, respectively) to the corresponding out-coupling gratings 14-1, 14-2, 16-1 and 16-2 in each of the substrates 10-1 and 10-2 as shown in FIG. 1b, such that both wavelength components 20 and 22 are provided in the output optical beam by each of the substrates 10-1 and 10-2 in spite of the fact that the out-coupling diffraction gratings 14-1 and 16-1 are optimized only for the wavelength component 20 and the out-coupling diffraction gratings 14-2 and 16-2 are optimized only for the wavelength component 22. This mixing of colors deteriorates the quality of the image provided by the exit pupil expander system 10. The example of the virtual reality display of FIG. 1a with the stacked diffractive exit pupil expanders, shown in FIG. 1b, can be used for applying embodiments of the present invention. FIGS. 2 through 6 provide different implementation examples for eliminating color mixing, according to embodiments of the present invention.

Figure 2A:
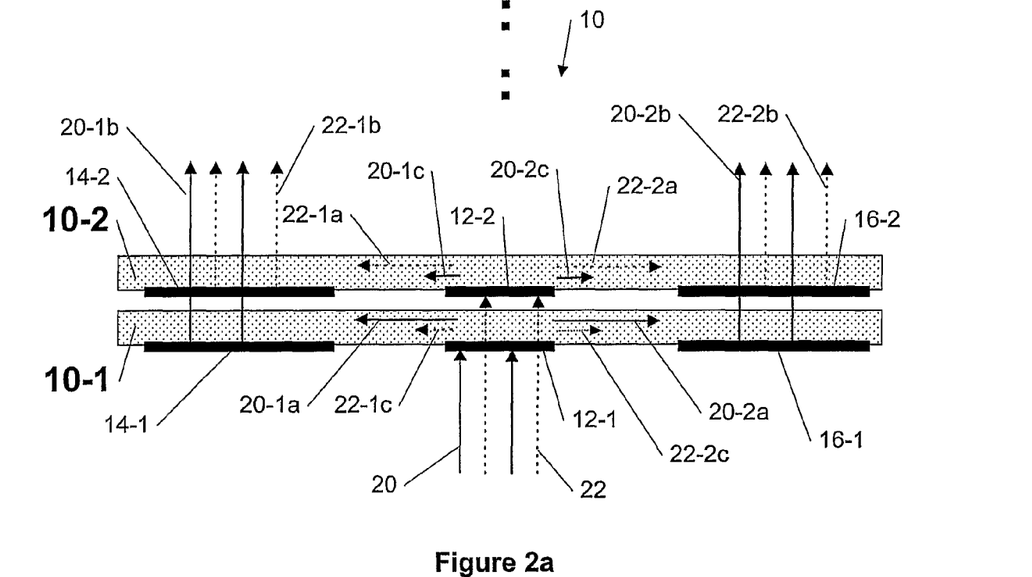
FIGS. 2a and 2b are schematic representations (cross-sectional views) demonstrating a color separation in an exit pupil expander system using absorbing tint through a volume of the substrates (FIG. 1a) and through a thickness of selected areas of the substrates between in-coupling and out-coupling gratings, according to embodiments of the present invention.
Figure 2B:
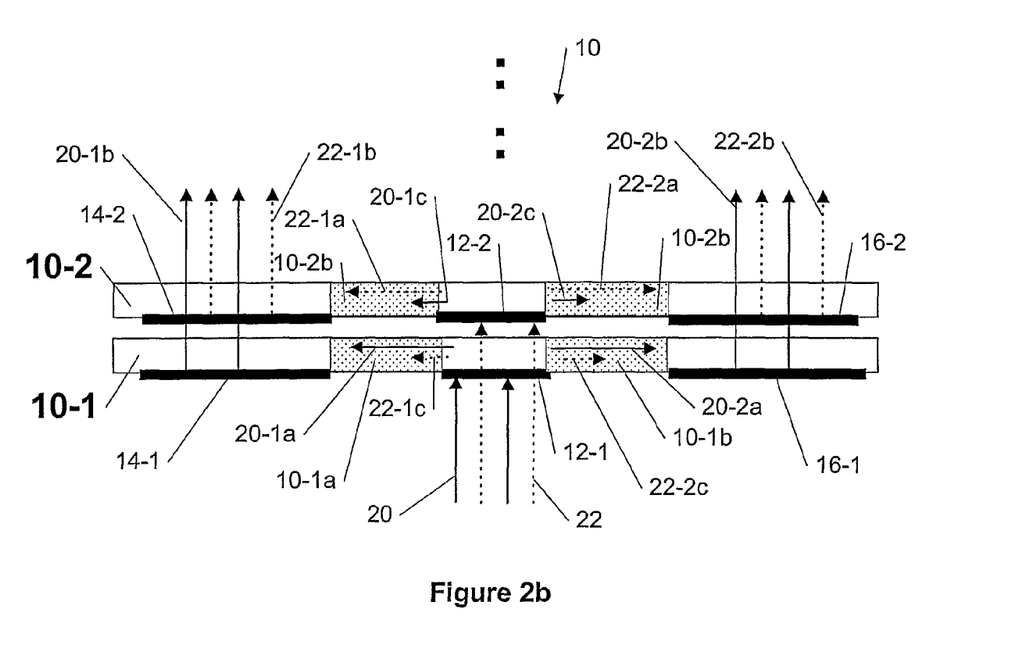

FIGS. 2a and 2b show examples among others of schematic representations (cross-sectional views) demonstrating a color separation in an exit pupil expander system 10 using absorbing tint through a volume of the substrates 10-1 and 10-2 (FIG. 1a) and through a thickness of selected areas 10-1a, 10-2a, 10-1b and 10-2b of the substrates 10-1 and 10-2 between the in-coupling gratings 12-1 and 12-2, and the out-coupling gratings 14-1, 14-2, 16-1 and 16-2, respectively, as shown in FIG. 2b, according to embodiments of the present invention. The absorbing tint in the substrate 10-1 is optimized for absorbing the wavelength component 22 while being transparent to the wavelength component 20, and the absorbing tint in the substrate 10-2 is optimized for absorbing the wavelength component 20 while being transparent to the wavelength component 22. Thus, each of the substrates 10-1 and 10-2 provides only one wavelength component: the optical beams 20-1b and 20-2b representing the wavelength component 20 are provided by the substrate 10-1, and the optical beams 22-1b and 22-2b representing the wavelength component 22 are provided by the substrate 10-2, respectively.

Figure 3A:
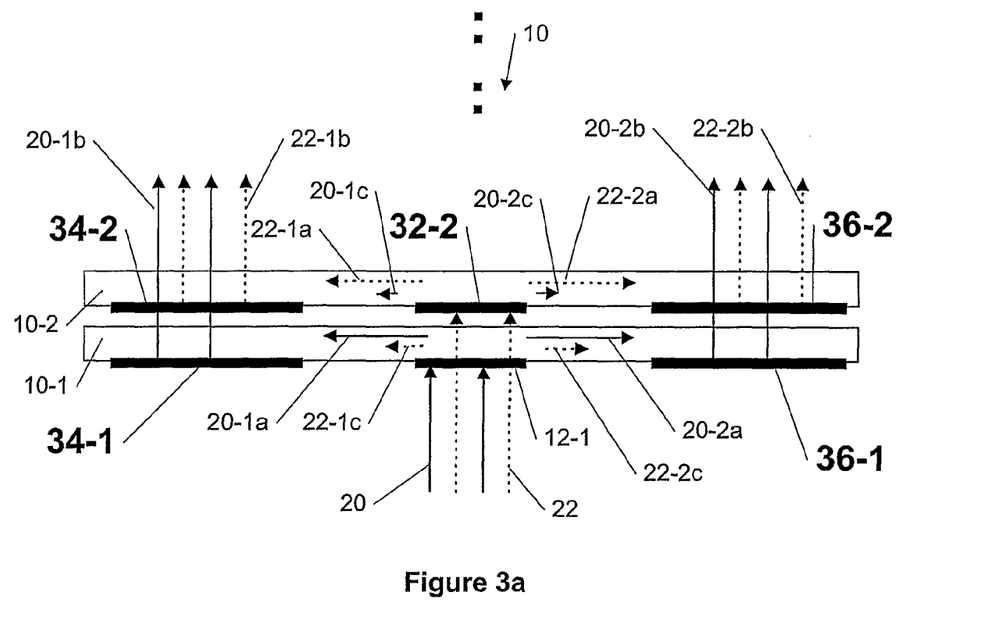
FIGS. 3a and 3b are schematic representations (cross-sectional views) demonstrating a color separation in an exit pupil expander system using absorbing tint spread throughout a resin in in-coupling and out-coupling gratings, according to embodiments of the present invention.
Figure 3B:
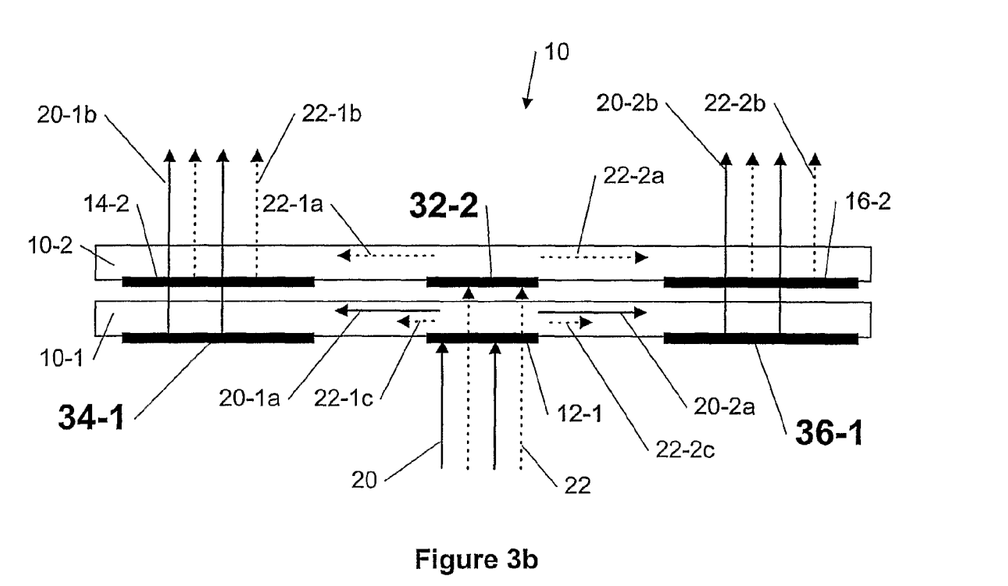

FIGS. 3a and 3b show examples among others of schematic representations (cross-sectional views) of a color separation in an exit pupil expander system 10 using the absorbing tint spread throughout a resin used in the in-coupling gratings 12-1 and 12-2 and/or in the out-coupling gratings 34-1, 34-2, 36-1 and 36-2, according to embodiments of the present invention. In FIG. 3a, the absorbing tint in the diffraction gratings 34-1, 36-1 of the first substrate 10-1 is optimized for absorbing the wavelength component 22 while being transparent to the wavelength component 20, and the absorbing tint in the diffraction gratings 34-2, 36-2 of the first substrate 10-2 is optimized for absorbing the wavelength component 20 while being transparent to the wavelength component 22, thus eliminating unwanted optical beams 20-1c, 22-1c, 20-2c, 22-2c by absorption in the out-coupling gratings 34-1, 34-2, 36-1 and 36-2. It is noted that the in-coupling grating 12-2 provides an initial attenuation of the unwanted optical beams 20-1c and 20-2c as shown in FIG. 3a. If the in-coupling grating 12-2 can provide enough attenuation of the unwanted optical beams 20-1c and 20-2c, then the out-couplings 14-2 and 16-2 do not need to be tinted at all as shown in FIG. 3b. This provides an advantage that the out-coupling beams 20-1b and 20-2b from the first substrate 10-1 are not attenuated by the absorbing tint in the diffraction gratings 14-2 and 16-2.

Figure 4A:
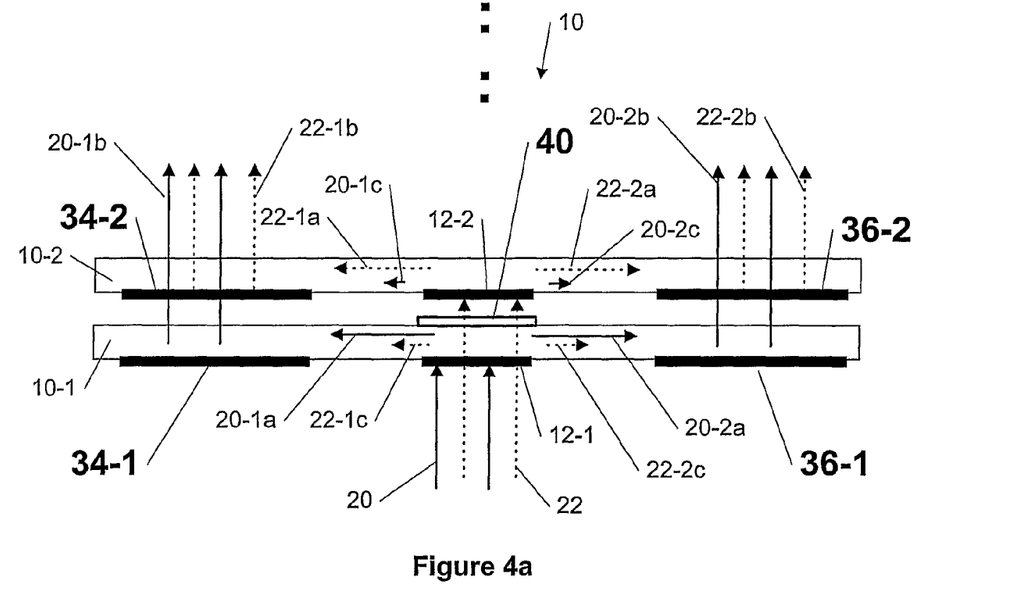
FIGS. 4a and 4b are schematic representations (cross-sectional views) demonstrating a color separation in an exit pupil expander system using absorbing tint spread throughout a resin in out-coupling gratings and absorbing coating across the in-coupling grating, according to embodiments of the present invention.
Figure 4B:
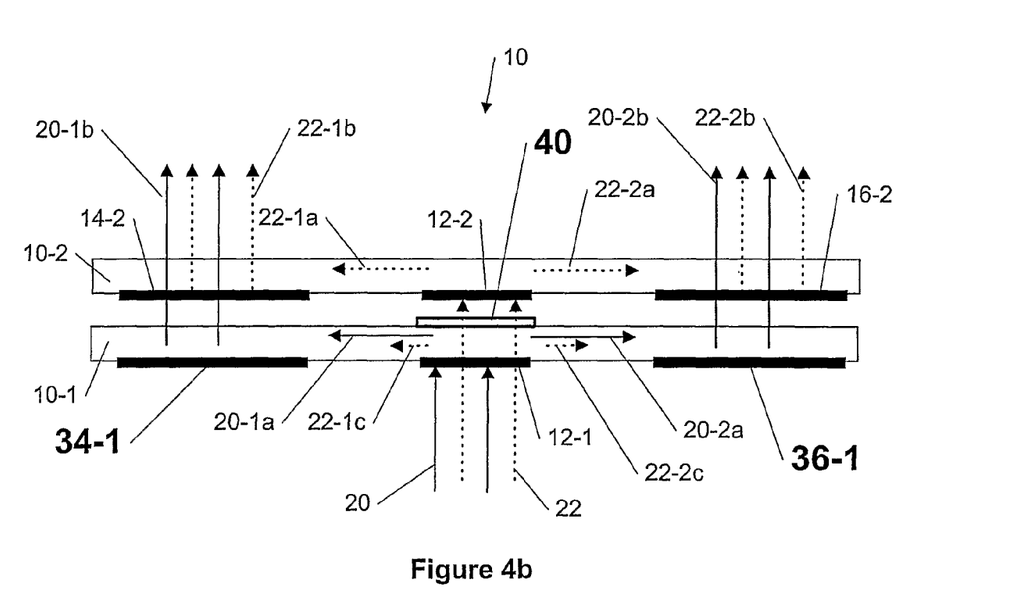

FIG. 4a shows an example among others of schematic representations (cross-sectional views) demonstrating a color separation in an exit pupil expander system 10 using the absorbing tint spread throughout a resin in the out-coupling gratings 34-1, 34-2, 36-1 and 36-2 such that the unwanted optical beams 20-1c, 22-1c, 20-2c, 22-2c are eliminated by absorption in the out-coupling gratings 34-1, 34-2, 36-1 and 36-2, respectively. In addition (optionally), an optically absorbing layer 40 disposed on or adjacent to a surface of the substrate 10-1 across the in-coupling grating 12-1 can absorb the wavelength component 20 for minimizing the presence of the unwanted optical beams 20-1c and 20-2c. If the in-coupling grating 12-2 can provide enough attenuation of the unwanted optical beams 20-1c and 20-2c, then the out-couplings 14-2 and 16-2 do not need to be tinted at all as shown in FIG. 4b. This provides an advantage that the out-coupling beams 20-1b and 20-2b from the first substrate 10-1 are not attenuated by the absorbing tint in the diffraction gratings 14-2 and 16-2, respectively.

Figure 5A:
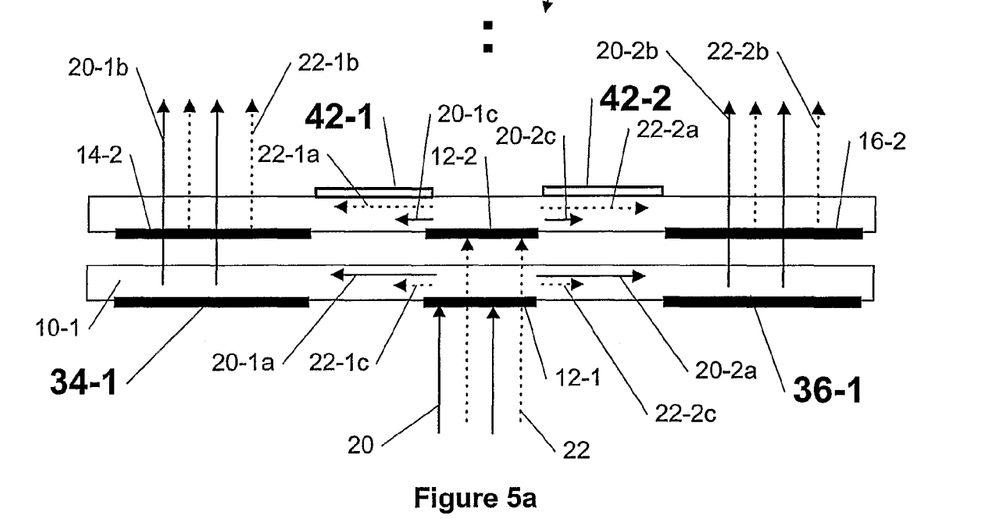
FIGS. 5a and 5b are schematic representations (cross-sectional views) demonstrating a color separation in an exit pupil expander system using absorbing coatings having substantially the same index of refraction as a substrate and disposed on the substrate in areas between in-coupling and out-coupling gratings, according to embodiments of the present invention.
Figure 5B:
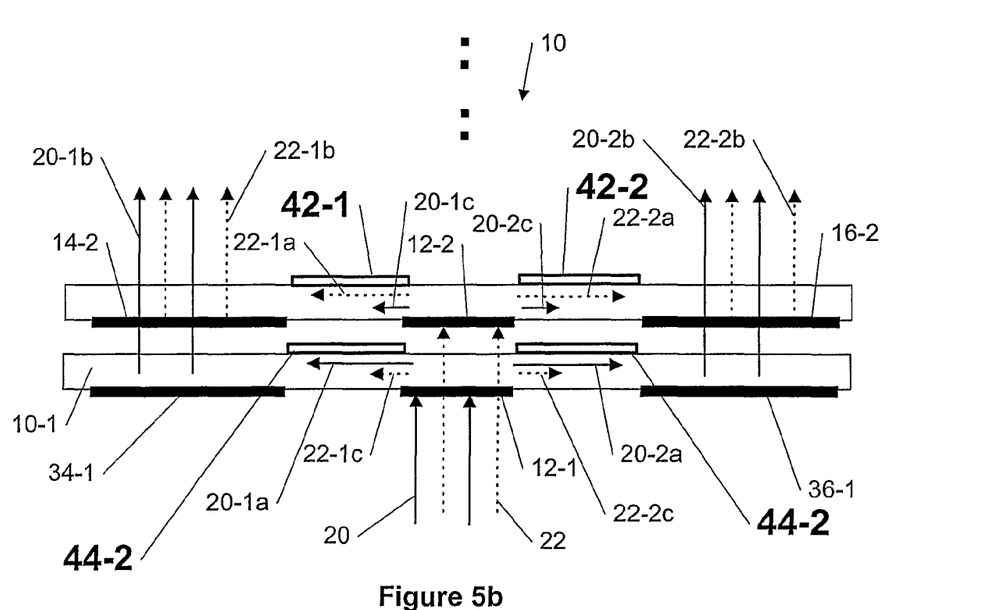

FIG. 5a shows an example among others of schematic representations (cross-sectional views) demonstrating a color separation in an exit pupil expander system 10 using the absorbing tint spread throughout the resin in the out-coupling gratings 34-1 and 36-1 of the first substrate 10-1 such that the unwanted optical beams 22-1c and 22-2c are eliminated by absorption in the out-coupling gratings 34-1 and 36-1, respectively. In the second substrate 10-2, absorbing coatings 42-1 and 42-2 having substantially the same index of refraction as the substrate 10-2 and disposed on the substrate 10-2 in areas between the in-coupling grating 12-2 and the out-coupling gratings 14-2 and 16-2, respectively, according to an embodiment of the present invention. These absorbing coatings 42-1 and 42-2 substantially absorb the unwanted optical beams 20-1c and 20-2c in the second substrate 10-2 acting as a boundary for the total internal reflection. In the example of FIG. 5b, instead of using the absorbing tint spread throughout the resin in the out-coupling gratings (as shown in FIG. 5a), further absorbing coatings 44-1 and 44-2 having substantially the same index of refraction as the substrate 10-1 and disposed on the substrate 10-1 in areas between the in-coupling grating 12-1 and the out-coupling gratings 14-1 and 16-1, respectively, according to a further embodiment of the present invention. These absorbing coatings 44-1 and 44-2 substantially absorb the unwanted optical beams 22-1c and 22-2c in the first substrate 10-1 acting as a boundary for the total internal reflection as well.

It is noted that tinting is a known art, e.g., see U.S. Pat. No. 6,464,733 "Tinting plastic articles" by C. U. Ryser. For selective tinting of the substrate (see FIG. 2b), the parts that needs to be tinted can be tinted separately. Then these parts can be molded together with clear plastics. The tinted and not tinted parts should have the same refractive index, which is usually the case, if the same material is used thoroughly, because the tinting does not usually alter the refractive index. Also radiation methods may be used for creating color centers in the material to alter the spectral absorption. Moreover, the diffraction gratings can be formed using a UV (ultraviolet) curable resin, which is tinted which, as known in the art.

Figure 6:
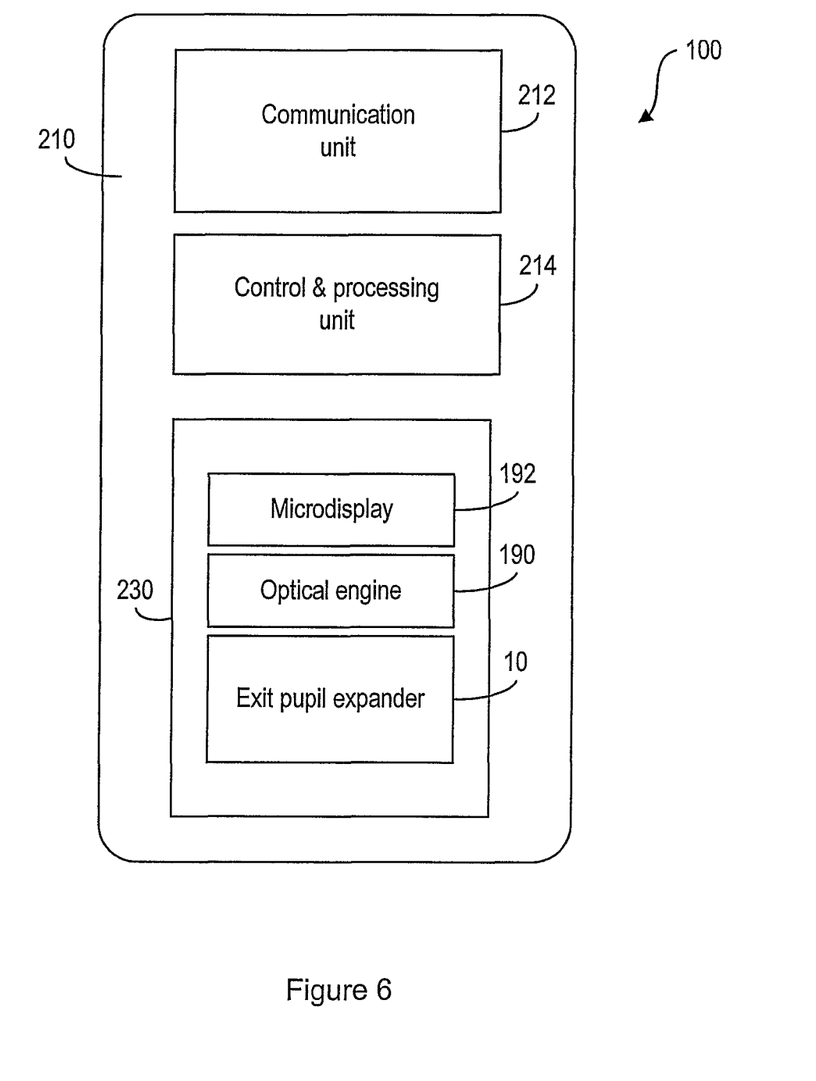
FIG. 6 is a schematic representation of an electronic device, having an exit pupil expander system, according to an embodiment of the present invention.

FIG. 6 shows an example of a schematic representation of an electronic device, having the exit pupil expander (EPE) system 10, according to an embodiment of the present invention.

The exit pupil expander (EPE) 10, 10a or 10b can be used in an electronic (portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 6, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The EPE 10, according to the present invention, can be optically linked to an optical engine 190.

Furthermore, the image source 192, as depicted in FIG. 6, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, handheld computer, digital video and still camera, wearable computer, computer game device, specialized bring-to-the-eye product for viewing and other portable electronic devices. However, the exit pupil expander, according to the present invention, can also be used in a non-portable device, such as a gaming device, vending machine, band-o-matic, and home appliances, such as an oven, microwave oven and other appliances and other non-portable devices.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
   at least one substrate of optical material having a first surface and a second surface;
   at least one diffractive element disposed on the first or the second surface of said at least one substrate and configured to receive an input optical beam;
   at least one further diffractive element disposed on the first or the second surface; and
   at least one optically absorbing area within or disposed on said at least one substrate, wherein
   at least part of the input optical beam is diffracted in the diffractive element to provide at least one diffracted optical beam substantially within the first and the second surfaces, and
   at least part of the at least one diffracted optical beam is coupled out of the at least one substrate by diffraction in said at least one further diffractive element, thus providing an output optical beam out of said at least one substrate with an expanded exit pupil in one or two dimensions, wherein
   said input optical beam comprises K wavelength components and said at least one optically absorbing area is configured to absorb M pre-selected components out of the K wavelength components of said at least one diffracted optical beam and to propagate a selected component out of the K wavelength components of said at least one diffracted optical beam, such that the output optical beam comprises said selected component out of the K wavelength components, wherein K is an integer of at least a value of two and M is an integer between 1 and K−1.

2. The apparatus of claim 1, wherein said optical device comprises N stacked substrates of optical material separated by a gap, N being an integer of at least a value of one, and said at least one substrate being one of said N substrates, wherein each of said N stacked substrates is configured to expand an exit pupil substantially of only one component out of said K wavelength components of the input optical beam such that all said K wavelength components merge together having substantially the same direction and location in an output of said optical device.

3. The apparatus of claim 2, wherein N=K.

4. The apparatus of claim 1, wherein M=K−1.

5. The apparatus of claim 1, wherein the output optical beam provided by the at least one substrate substantially comprises only said selected component out of the K wavelength components.

6. The apparatus of claim 1, wherein said at least one optically absorbing area is configured using at least one of:
   an absorbing tint spread throughout a volume of the at least one substrate,
   an absorbing tint spread throughout a thickness of the at least one substrate only in areas of the at least one substrate between the at least one diffractive element and at least one further diffractive element,
   an absorbing tint spread throughout a resin used to make said at least one diffractive element,
   an absorbing tint spread throughout the resin used to make said at least one further diffractive element, and
   an absorbing coating, having substantially the same index of refraction as the at least one substrate, disposed on the at least one substrate in an area substantially between the at least one diffractive element and the at least one further diffractive element.

7. The apparatus of claim 1, further comprises:
   a further substrate of optical material having a further first surface and a further second surface, said further substrate being stacked substantially in parallel with said at least one substrate but maintaining a gap with said at least one substrate;
   at least one additional diffractive element disposed on the further first or the further second surface of said further substrate and configured to receive a portion of the input optical beam which propagates through the at least one substrate into the further substrate;
   at least one still further diffractive element disposed on the further first or the further second surface; and
   at least one further optically absorbing area within or disposed on said further substrate, wherein
   at least further part of the portion of the input optical beam is diffracted in the additional diffractive element to provide at least one further diffracted optical beam substantially within the further first and the further second surfaces, and
   at least further part of the at least one further diffracted optical beam is further coupled out of the further substrate by diffraction in said at least one still further diffractive element, thus providing a further output optical beam out of said further substrate with an expanded exit pupil in one or two dimensions, said further output optical beam having substantially the same direction and location as the output optical beam, wherein
   said at least one further optically absorbing area is configured to absorb P pre-selected components of the K wavelength components and to propagate a further selected component out of the K wavelength components, such that the further output optical beam comprises said further selected component out of the K wavelength components, wherein P is an integer between 1 and K−1.

8. The apparatus of claim 7, wherein P=K−1.

9. The apparatus of claim 7, wherein said at least one further optically absorbing area is configured using at least one of:
   an absorbing tint spread throughout a volume of the further substrate,
   an absorbing tint spread throughout a thickness of the further substrate only in areas of the further substrate between the at least one additional diffractive element and at least one still further diffractive element, an absorbing tint spread throughout a resin used to make said at least one additional diffractive element, an absorbing tint spread throughout the resin used to make said at least one still further diffractive element, and an absorbing coating, having substantially the same index of refraction as the further substrate, disposed on the further substrate between the at least one additional diffractive element and the at least one still further diffractive element.

10. The apparatus of claim 7, wherein said gap is an air gap.

11. The apparatus of claim 7, wherein the output optical beam provided by the at least one substrate substantially comprises only said selected component out of the K wavelength components and the further output optical beam provided by the further substrate substantially comprises only said selected further component out of the K wavelength components and the output optical beam and the further output optical beam merge together having substantially the same direction and location.

12. The apparatus of claim 1, wherein said at least one substrate is configured to have an additional optically absorbing layer disposed on or adjacent to a surface of said at least one substrate, said surface being a second surface through which the input optical beam propagates, such that said selected component out of the K wavelength components is substantially absorbed in said additional optically absorbing layer.

13. The apparatus of claim 1, further comprises at least one intermediate diffractive element such that the at least part of the input optical beam diffracted in the at least one diffractive element is first coupled to said at least one intermediate diffractive element, which then couples, using a further diffraction in said at least one intermediate diffractive element, said at least part of said diffracted optical beam to said at least one further diffractive element, which then provides a two-dimensional exit pupil expansion of said input optical beam.

14. A method, comprising:
receiving an input optical beam by at least one diffractive element disposed on a first or a second surface of at least one substrate, said input optical beam comprises K wavelength components, wherein K is an integer of at least a value of two;

diffracting at least part of the input optical beam in the at least one diffractive element to provide at least one diffracted optical beam substantially within the first and second surfaces;

absorbing M pre-selected components out of the K wavelength components of said at least one diffracted optical beam in at least one optically absorbing area within or disposed on said at least one substrate and propagating a selected component out of the K wavelength components of said at least one diffracted optical beam substantially without an optical intensity attenuation in said at least one optically absorbing area, wherein M is an integer between 1 and K−1; and coupling at least part of the at least one diffracted optical beam out of the at least one substrate by diffraction in said at least one further diffractive element, thus providing an output optical beam out of said at least one substrate with an expanded exit pupil in one or two dimensions, wherein the output optical beam comprises said selected component out of the K wavelength components.

15. The method of claim 14, wherein the output optical beam provided by the at least one substrate substantially comprises only said selected component out of the K wavelength components.

16. The method of claim 14, wherein said at least one optically absorbing area is configured using at least one of:
an absorbing tint spread throughout a volume of the at least one substrate, an absorbing tint spread throughout a thickness of the at least one substrate only in areas of the at least one substrate between the at least one diffractive element and at least one further diffractive element, an absorbing tint spread throughout a resin used to make said at least one diffractive element, an absorbing tint spread throughout the resin used to make said at least one further diffractive element, and an absorbing coating, having substantially the same index of refraction as the at least one substrate, disposed on the at least one substrate in an area substantially between the at least one diffractive element and the at least one further diffractive element.

17. An electronic device, comprising:
a data processing unit;
an optical engine operatively connected to the data processing unit for receiving image data from the data processing unit;
a display device operatively connected to the optical engine for forming an image based on the image data; and
an exit pupil expander comprising:
at least one substrate of optical material having a first surface and a second surface;
at least one diffractive element disposed on the first or the second surface of said at least one substrate and configured to receive an input optical beam;
at least one further diffractive element disposed on the first or the second surface; and
at least one optically absorbing area within or disposed on said at least one substrate, wherein
at least part of the input optical beam is diffracted in the diffractive element to provide at least one diffracted optical beam substantially within the first and the second surfaces, and
at least part of the at least one diffracted optical beam is coupled out of the at least one substrate by diffraction in said at least one further diffractive element, thus providing an output optical beam out of said at least one substrate with an expanded exit pupil in one or two dimensions, wherein
said input optical beam comprises K wavelength components and said at least one optically absorbing area is configured to absorb M pre-selected components out of the K wavelength components and to propagate a selected component out of the K wavelength components substantially without an optical intensity attenuation, such that the output optical beam comprises said selected component out of the K wavelength components, wherein K is an integer of at least a value of two and M is an integer between 1 and K−1.

18. The electronic device of claim 17, wherein said exit pupil expander comprises N stacked substrates of optical material separated by a gap, N being an integer of at least a value of one, and said at least one substrate being one of said N substrates, wherein each of said N stacked substrates is configured to expand an exit pupil substantially of only one component out of said K wavelength components of the input optical beam such that all said K wavelength components merge together having substantially the same direction and location in an output of said optical device.

19. The electronic device of claim 18, wherein N=K.

20. The electronic device of claim 17, wherein M=K−1.

21. The electronic device of claim 17, wherein the output optical beam provided by the at least one substrate substantially comprises only said selected component out of the K wavelength components.

22. The electronic device of claim 17, wherein said at least one optically absorbing area is configured using at least one of:
- an absorbing tint spread throughout a volume of the at least one substrate,
- an absorbing tint spread throughout a thickness of the at least one substrate only in areas of the at least one substrate between the at least one diffractive element and at least one further diffractive element,
- an absorbing tint spread throughout a resin used to make said at least one diffractive element,
- an absorbing tint spread throughout the resin used to make said at least one further diffractive element, and
- an absorbing coating, having substantially the same index of refraction as the at least one substrate, disposed on the at least one substrate in an area substantially between the at least one diffractive element and the at least one further diffractive element.

* * * * *